Jan. 27, 1959  F. G. BURG  2,870,659
MACHINE TOOL HAVING A TURRET HEAD
Filed July 1, 1957  5 Sheets-Sheet 2
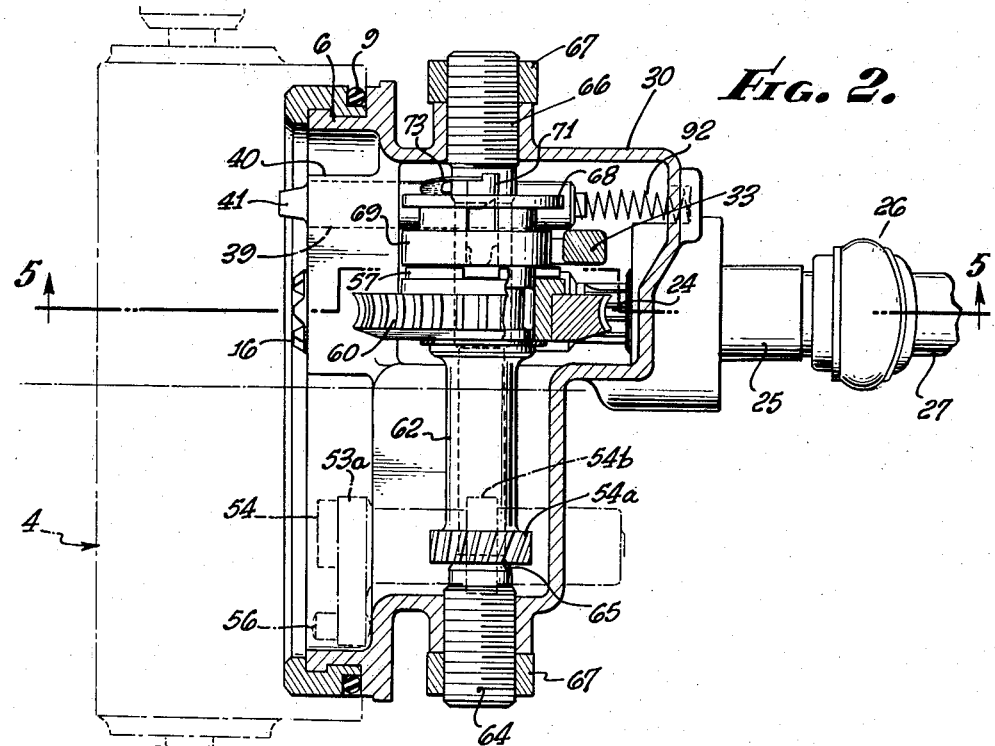
INVENTOR.
FRED G. BURG,
BY
Flam and Flam
ATTORNEYS.

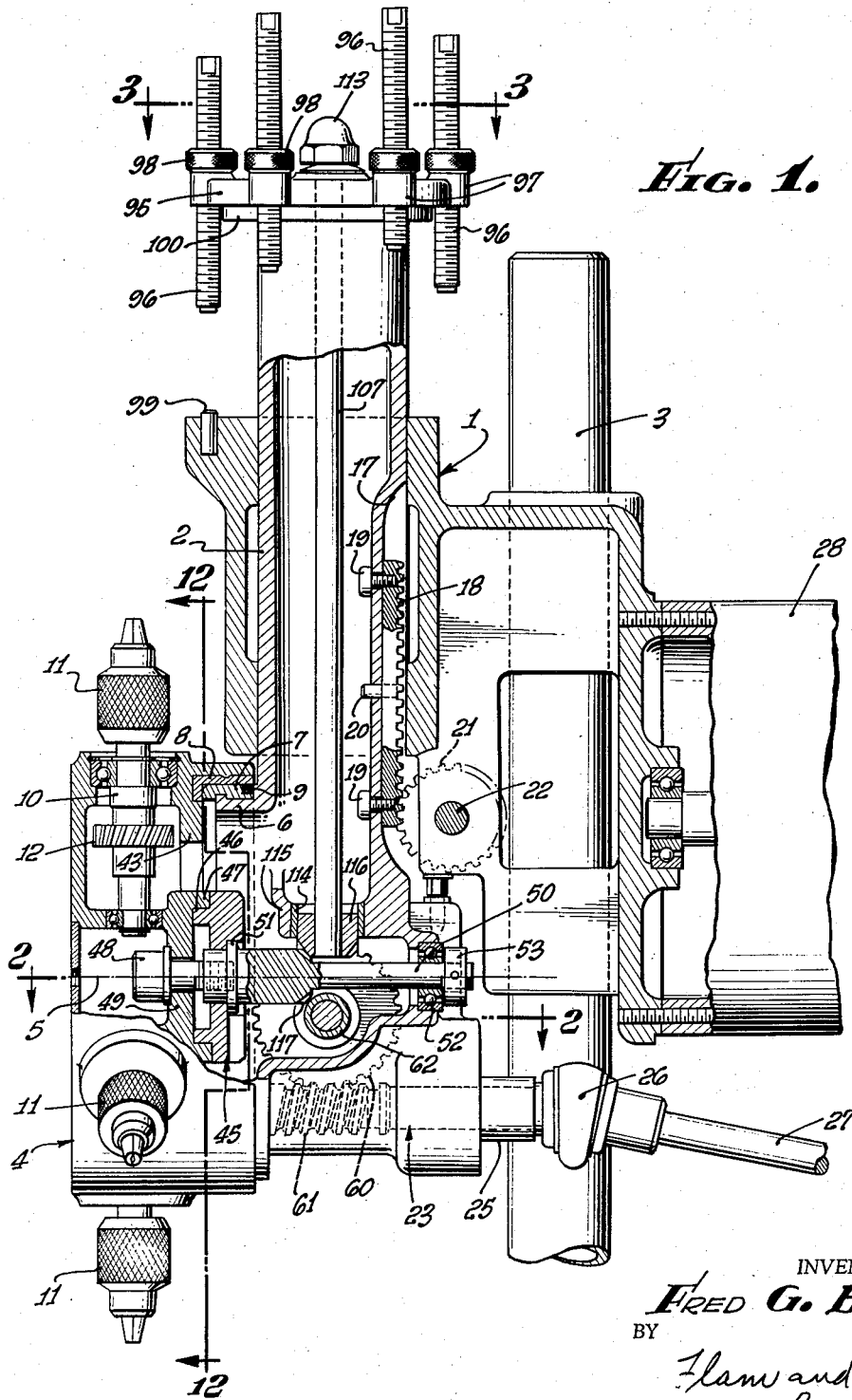

Jan. 27, 1959

F. G. BURG 2,870,659

MACHINE TOOL HAVING A TURRET HEAD

Filed July 1, 1957

INVENTOR.
FRED G. BURG,
BY
Hann and Hann
ATTORNEYS.

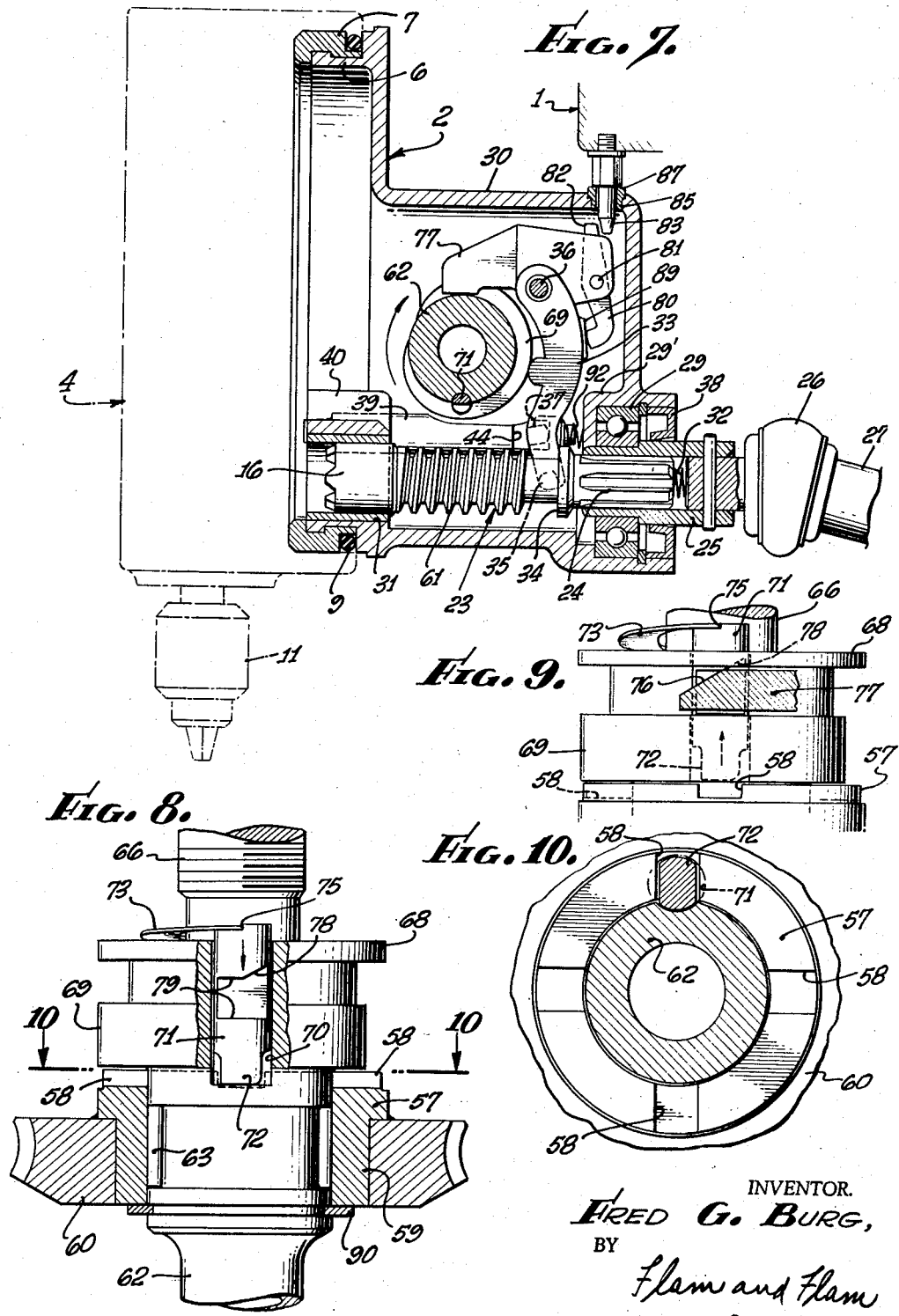

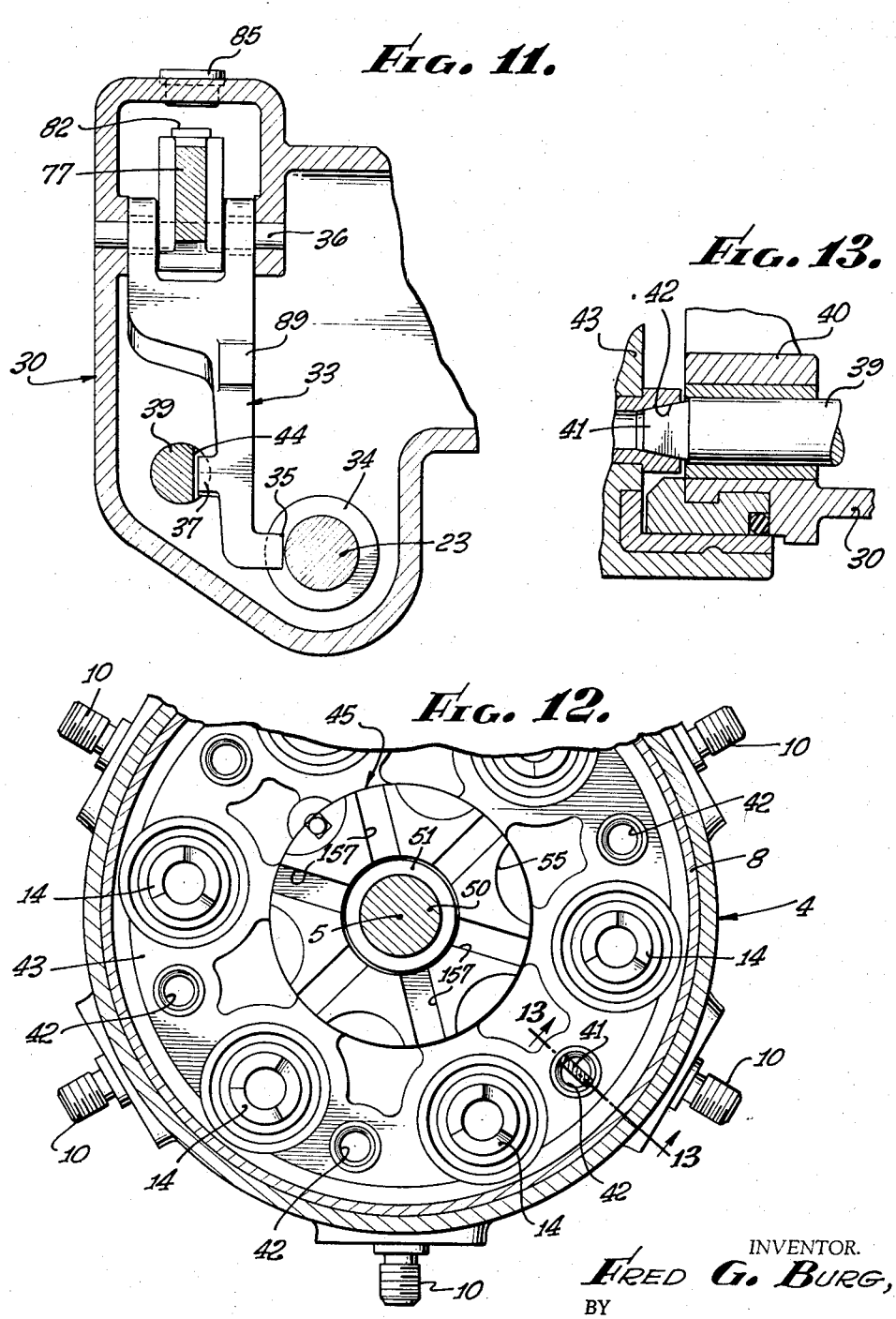

United States Patent Office 2,870,659
Patented Jan. 27, 1959

2,870,659

MACHINE TOOL HAVING A TURRET HEAD

Fred G. Burg, Los Angeles, Calif.

Application July 1, 1957, Serial No. 669,091

7 Claims. (Cl. 77—25)

This invention relates to machine tools of the type described in prior United States Letters Patent issued in the name of Fred G. Burg and identified as follows: No. 2,670,636, issued March 2, 1954, and No. 2,795,307, issued on June 11, 1957.

In such mechanisms, there is an angularly adjustable turret head. The head is provided with a plurality of radially arranged rotary chucks adapted to hold rotary tools, such as drills, taps, threading dies, reamers, or the like. The tools are equiangularly spaced; and if there are six of them, the angular adjustment of the head is effected in intermittent steps through 60° so as to bring the tools successively into operative relation to the work.

In order to move the tool toward and from the work, a carriage or slide for the head is so arranged that it may be manipulated for this purpose. Upon completion of an operation, and as the carriage or slide is moved away from the work, a trip mechanism serves to initiate the angular adjustment of the head. This trip mechanism includes a fixed abutment against which a tripper is moved by the motion of the carriage.

It is one of the objects of this invention to improve and simplify this trip mechanism.

In Patent No. 2,670,636, hereinabove identified, there is disclosed a limiting means for the movement of the tool toward the work, to determine for example the depth of a drilled hole, or the like. By an angularly adjustable mechanism, the forward travel of each of the six tools can be independently limited, as for example, by independent abutments, brought into effective position by angular adjustment synchronously with the adjustment of the head or turret.

It is another object of this invention to improve in general such limiting devices. More particularly, it is a specific object to ensure against damage should the adjusting mechanism be operated while an abutment may not entirely clear other parts of the device in the course of its adjusting movement.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary longitudinal sectional view of a machine tool incorporating the invention;

Fig. 2 is an enlarged sectional view taken along a plane corresponding to line 2—2 of Fig. 1, some of the elements being shown in phantom elevation for simplifying the drawings;

Fig. 3 is a sectional view taken along a plane corresponding to line 3—3 of Fig. 1;

Fig. 4 is a fragmentary sectional view taken along a plane corresponding to line 4—4 of Fig. 3;

Fig. 7 is a view similar to Fig. 5 illustrating a still later phase in the operation of the tripper mechanism;

Fig. 8 is a fragmentary sectional view taken through the one-revolution transmission;

Fig. 9 is a sectional view taken along a plane corresponding to line 9—9 of Fig. 5;

Fig. 10 is a sectional view, taken along a plane corresponding to line 10—10 of Fig. 8;

Fig. 11 is a sectional view taken along a plane corresponding to line 11—11 of Fig. 5;

Fig. 12 is a sectional view taken along a plane corresponding to line 12—12 of Fig. 1; and Fig. 13 is a detail sectional view, somewhat enlarged, taken along a plane corresponding to line 13—13 of Fig. 12.

Figure 5:
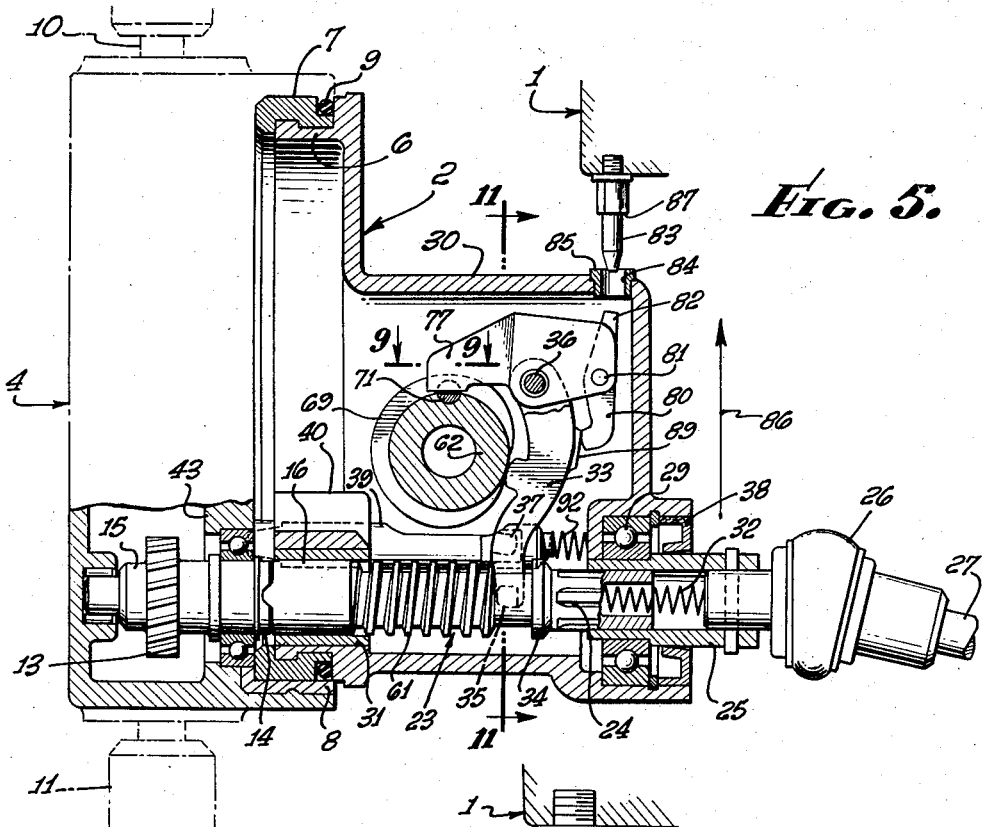
Fig. 5 is a sectional view taken along a plane corresponding to line 5—5 of Fig. 2.

As shown most clearly in Fig. 1, the machine tool includes a fixed guide 1 usually arranged in a vertical direction, within which a carriage structure 2 is guided for reciprocatory movement. The stationary guide 1 may be arranged to be adjusted with respect to a rigid post 3 in any desired manner.

A head 4 is angularly adjustable about an axis 5 transverse to the direction of movement of the carriage 2. This head 4 is mounted for rotation with respect to a hollow transverse extension 6 on the carriage 2 (see also Figs. 2, 5 and 7). A ring 7, presenting an exterior bearing surface, is mounted upon the outer periphery of this extension 6. Since the ring 7 has an internal guiding groove cooperating with the end flange of projection 6, the ring 7 is preferably split to facilitate assembly. Upon the exterior surface of this bearing ring 7, the head 4 is angularly adjustable. A bearing sleeve 8 (Fig. 1) is provided for this purpose. On O-ring 9 disposed in a groove in the ring 7 serves to effect a seal between the relatively angularly movable surfaces.

There will be hereinafter described the means for restraining the head 4 against any substantial axial movement with respect to the transverse axis 5.

The head 4 carries a plurality of equiangularly disposed rotary tool shafts 10 (Fig. 12). In the present instance, six such tool shafts are utilized and arranged with threaded ends to accommodate the tool chucks 11. These tool shafts are driven by power in a manner substantially identical with that disclosed in the prior patents hereinabove identified.

For this purpose, as shown most clearly in Fig. 1, each of the shafts 10 may be provided with a spiral gear 12 adapted to be driven through corresponding spiral gears 13 (Fig. 5) mounted on axes parallel to axis 5 and each including one portion 14 of a coupling structure (Figs. 5 and 12). Each gear 13 is mounted upon a shaft 15 appropriately rotatably supported within the head 4.

Since this portion of the apparatus is quite similar to that disclosed in the said prior patents, further description of the details thereof is unnecessary. It is sufficient to point out that as each chuck 11 successively assumes a downwardly directed position, it is arranged to be driven by the aid of another coupling member 16 (Figs. 5 and 7) which may be moved axially into and out of cooperative relation with the coupling member 14.

The carriage 2 is arranged to be moved within guide 1, in a direction parallel with the axis of the downwardly directed shaft 10, as by the aid of a rack and pinion mechanism. Thus, for example, in a recess or slot 17 (Fig. 1) of the carriage 2 there is supported a rack 18. This rack 18 is attached to the carriage 2 by the aid of machine screws 19, and a dowel pin 20 is utilized for proper alignment of the rack.

Meshing with the rack 18 is a pinion 21 mounted on a shaft 22. This shaft 22 may be connected to a handwheel or the like (not shown) for manually raising and lowering the carriage 2. Shaft 22 is appropriately supported by the frame of guide 1.

The coupling member 16 (Figs. 5 and 7) is mounted on a shaft 23. This shaft is axially movable. For transmitting a rotary force thereto, it has external splines 24 interfitting internal splines in a hollow driving shaft 25. This hollow shaft 25 is attached to an appropriate universal joint 26 which transmits motion from a shaft 27 continuously rotated by the aid of a source of motion mounted in a case 28 (Fig. 1). This case 28 is attached to the frame of guide 1.

The shaft 25 is supported as by the aid of a ball bearing structure 29 supported by a boss 29' (Fig. 7) formed on a gear box or casing 30 formed integrally with the carriage 2. The exterior surface of the coupling member 16 is cylindrical. It cooperates with sleeve bearings 31 in the casing 30, for rotatably supporting the left-hand end of the shaft assembly.

Extending around the shaft 25, as shown most clearly in Figs. 5 and 7, is an oil seal ring 38 so as to prevent oil or lubricant from escaping along the shaft 25.

A compression spring 32 serves to urge the shaft 23 toward the left, that is, toward coupling engaging position. This spring 32 enters a recess in the right-hand end of the shaft 23.

For moving the coupling member 16 to the disengaged position of Fig. 7, there is provided a lever 33 (see also Fig. 11). This lever has an end 35 cooperating with a flange 34 fixed on shaft 23. By movement of lever 33 toward the right, end 35 is caused to engage flange 34 and to move it to the coupling disengaging position of Fig. 7. Lever 33 is mounted upon a stationary pivot pin 36 supported by the gear casing 30 (Fig. 11). The lever 33 is moved to the unclutching position of Fig. 7 in a manner to be hereinafter described.

The lever 33 has another projection 37 which serves to retract a locating pin 39 (see particularly Figs. 5, 7, 11 and 13). This locating pin is guided for axial movement in a boss 40 formed in casing 30. A spring 92 (Figs. 2 and 5) urges the pin into operative engagement with head 4. The pin for this purpose has a flattened end 41 (see Figs. 2 and 13) adapted to fit within one of the sockets 42 having a tapered aperture, mounted in the wall 43 of the head 4.

The pin 39 also has a flattened portion 44 (Fig. 11) defining a surface against which projection 37 may act for retracting the pin 39. The retracted position is indicated in Fig. 7.

The retraction of the locating pin 39 from the active one of the sockets 42, and the retraction of the coupling member 16, both by operation of the lever 33, are preparatory to the angular adjustment of the head 4 about its axis 5. At the end of the adjustment period, the lever 33 moves toward the left as viewed in Fig. 7 so as to return the locating pin 39 to the successive socket 42; and to return the coupling member 16 into cooperative relation with a coupling member 14 associated with the successive tool shaft 10.

An adjustment of the head 4 through an angle of 60° is obviously necessary to bring the succeeding one of the six tool holding chucks 11 into operative position.

For this purpose, use is made of a Geneva movement, effective to adjust head 4, after the coupling member 16 and the locating pin 39 are withdrawn to the positions shown in Fig. 7.

This Geneva movement includes a Geneva wheel 45 (Figs. 1 and 12) carried by head 4, and having its axis on axis 5. This Geneva wheel 45 has a flange 46 press-fitted into a flange 47 carried by the head 4. Furthermore, the Geneva wheel 45 is utilized to support one end of a shaft 50, for a purpose to be hereinafter described. Thus, a machine screw 48 passes through a wall 49 of the head 4 and engages a threaded aperture in the left-hand end of shaft 50. This shaft 50 carries a flange 51 engaging the right-hand surface of the Geneva wheel 45. The shaft 50 is journaled at its right-hand end by the aid of the ball bearing 52 mounted in the carriage 2. A collar 53 carried by the shaft 50 and adjacent the right-hand side of the bearing 52 is provided to limit axial movement of the shaft 50, as well as axial movement of head 4. This shaft 50 is located on the axis 5 of the head 4, and is angularly moved in unison with angular adjusting movement of head 4.

Rotation of the Geneva wheel 45 is effected by the aid of a crank 53a (Fig. 2) mounted on a shaft which is rotated by the aid of spiral gears 54a and 54b. This spiral gear 54a as hereinafter described is given one complete revolution for the purpose of rotating the crank 53a through a revolution. This crank 53a carries a member 54 having a convex surface adapted to engage a concave surface 55 (Fig. 12) of the Geneva wheel 45. By this means, accurate 60° adjustments can be effected. The pin 56 carried at the end of the crank 53a is adapted to engage one of the series of radial slots 157. One complete revolution of the crank 53a suffices to advance the Geneva wheel 45 by one-sixth of a revolution.

The Geneva wheel and its operator are substantially the same as those described in prior Patent No. 2,795,307, dated June 11, 1957 hereinabove referred to.

Rotation of the crank shaft 50, and the movement of the lever 33 in a counterclockwise direction for withdrawing the locating pin 39 and for moving the member 16 to uncoupling position is automatically effected by a transmission mechanism controlled by a tripper. The tripper mechanism serves to cause a one-revolution clutch to make a complete revolution to perform all three of these functions.

The one-revolution clutch structure includes a clutch part 57 (Figs. 2, 8, 9 and 10). This clutch part 57 has one or more radial recesses 58 adapted to cooperate with a releasable clutch part which will be hereinafter described. The clutch part 57 has a hollow cylindrical extension 59 attached, as by welding, within the hub of a constantly driven worm wheel 60. This worm wheel 60, as shown most clearly in Fig. 1, is driven by a worm 61 formed on the constantly driven shaft 23 (see also Figs. 5 and 7).

Accordingly, the clutch part 57 is continuously rotated. It is rotatably mounted upon a shaft 62 by the aid of the extension 59. A split spring ring 90 engaging in a groove in shaft 62 prevents downward axial movement of worm wheel 60, as viewed in Fig. 8. Upward movement is restrained by a flange 69 formed on shaft 62.

Needle bearings 63 are provided between the shaft 62 and the cylindrical extension 59. The shaft 62 is supported at its lower end, as viewed in Fig. 2, by the aid of a headless screw 64 that has a conical extension 65. This conical extension fits a corresponding recess in the shaft 62.

A similar headless screw 66 is arranged at the upper end of the shaft 62. These screws 64 and 66 are adjustably mounted in bosses appropriately formed on the gear box 30 and they are held in adjusted position by the aid of lock nuts 67.

The shaft 62 carries adjacent one end thereof a pair of spaced flanges 68 and 69. Adjacent the upper end of the shaft, as viewed in Fig. 8, there is a groove 70 in the shaft periphery for the accommodation of a slidable dog or clutch part 71. This clutch part has an active end 72 adapted to be engaged within one or the other of the recesses 58 (Figs. 8, 9 and 10) of the constantly rotating clutch part 57.

In the position of Fig. 8, the end 72 is in active engagement with the clutch part 57. In the position of Fig. 9, this part 72 is withdrawn from active engagement with the clutch part 57 and accordingly the shaft 62 is not rotating.

Figure 6:
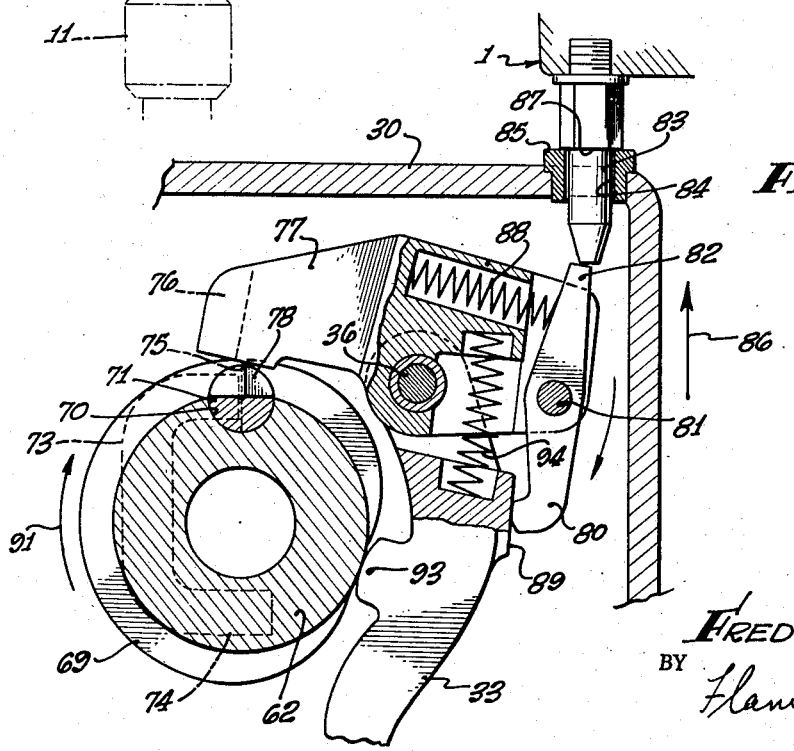
Fig. 6 is an enlarged fragmentary view, similar to Fig. 5, but illustrating another phase in the operation of the tripper mechanism.

For resiliently urging the dog or clutch part 71 toward engaging position, use is made of a U-shaped leaf spring 73 (Figs. 6, 8 and 9). One end 74 of this U-shaped spring is firmly attached, as by welding, to the outer surface of the flange 68. The other end presents a flat edge cooperating with a shoulder 75 formed at the upper end of the dog or clutch part 71. This spring, engaging the shoulder 75, prevents rotation of the clutch part 71 within the recess 70.

In the position of Fig. 9, the clutch part 71 is restrained against engaging the clutch part 57. This is effected by the aid of a cam member 77. This cam member has an end adapted to be received between flanges 68 and 69. The member 77 has a surface 76 oblique to the axis of shaft 62. This sloping surface 76 is intended to engage a sloping surface 78 forming the wall of a slot in clutch part 71. This surface 78 forms a continuation of the upper one of the parallel sides 79 of the slot. When the cam 77 is in the position of Figs. 5 and 9, the dog 71 has been moved upwardly (as viewed in Fig. 9) by the coaction between the sloping surfaces 76 and 78.

When it is desired to cause engagement of the clutch parts 71 and 57, the cam member 77 is lifted away from the surface 78, to a position indicated in Fig. 6. Under such circumstances, the clutch part 71 is urged by spring 73 to enter any one of the recesses 58. Now as the cam member 77 is lowered to the position shown in Fig. 7, then upon the completion of one revolution, the dog or clutch part 71 is moved out of the recess 58 by cam surface 76, and the shaft 62 is disconnected from worm wheel 60.

The cam member 77 is shown in Figs. 5, 6 and 11 as mounted upon the pin 36. It is disposed between opposite arms formed on the end of the lever 33. It is tiltable in a clockwise direction as by the aid of a tripper lever 80 shown to best advantage in Figs. 5, 6 and 7. This tripper lever 80 serves as a force transmitter to member 77. For this purpose, it is mounted on a pivot pin 81 carried by the cam member 77. It has an upwardly directed arm 82 which when depressed serves to tilt the cam member 77 in a clockwise direction so as to free the dog or clutch part 71 and to cause the shaft 62 to rotate.

To effect this tripping action automatically, the tripper 82 is arranged to be contacted by a stationary abutment 83 carried by the frame of guide member 1. A bushing 85 is carried in the upper wall of gear casing 30 and provides an aperture 84, permitting the abutment 83 to enter the gear casing upon upward movement of the carriage 2. As the gear casing 30 thus moves upwardly, as indicated by arrows 86 in Figs. 5 and 6, the upper end of the lever 82 comes into contact with the lower end of the abutment 83. This upward motion is limited by a shoulder 87 formed on the abutment 83. Until the motion of the gear casing is thus arrested, the upper arm 82 of the lever 80 serves as a strut which serves to transmit a force urging the cam member 77 in a clockwise direction to the free position of Fig. 6. A compression spring 88 interposed between cam member 77 and lever 80 urges the lever 80 toward the active abutment engaging position. However, the clockwise motion of lever 80 about the axis of pin 81 is limited by contact of the lower end of lever 80 with pad 89 on lever 33. This lever in turn is urged by compression spring 94 to a position determined by contact of projection 93 with the periphery of flange 69. Accordingly, the lever 80 is normally maintained in a position aligned with abutment 83.

Lever 80 is moved to the position of Fig. 7 where it is out of abutment engaging position so as to permit return of the member 77 to the restraining position of Fig. 9. For this purpose, use is made of the pad 89 on lever 33. The lever 33 moves in a clockwise direction about pin 36 and urges the lever 80 to the freeing position of Fig. 7. This lever 33 is moved in this direction by the aid of the flange 69 which has a cam surface engaging the projection 93 of the lever 33. Just as soon as the shaft 62 is rotated to a slight degree in a clockwise direction, indicated by arrow 91 in Fig. 6, the cam 69 is effective to move the lever 33 toward the right. This causes not only the return of the cam member 77 to its active position, but it also serves to retract the coupling member 16 and the locating pin 39 as heretofore explained, by virtue of the rightward movement of lever 33.

The arrangement of the compression springs 88 and 94 is such that in the position of Fig. 5 (between head adjusting periods), the spring 94 urges lever 33 against cam 69, and urges cam member 77 inwardly between flanges 68 and 69; and spring 88 serves to urge the lever 80 against lever 33, to position it in alignment with abutment 83.

Due to the configuration of cam 69, it is clear that just as soon as shaft 62 begins its revolution, the lever 33 is urged to move tripper lever 80 out of the way of abutment 83, and to cause cam member 77 to be urged by springs 88 and 94 to the position of Fig. 5, preparatory to the withdrawal of dog 71 from the clutch part 57.

The lever 33 returns to the position of Fig. 5 after one revolution of shaft 62. Under such circumstances, the spring 32 moves the coupling member 16 into engagement with the then aligned coupling member 14. It also permits the compression spring 92 (Fig. 2) to urge the locating pin 39 into engagement with the then aligned tapered socket 42.

The shaft 62 drives the spiral gear 54b (Fig. 2) to rotate the crank 53 through one revolution and to cause angular adjustment of the head 4.

As shown most clearly in Fig. 7, the return of the cam member 77 is effected long prior to the completion of a revolution of the shaft 62. In this way, it is assured that this cam member will be in proper position to stop the rotation of the shaft 62 when the dog or clutch part 71 arrives in the position of Fig. 9.

Provisions are made for limiting the downward movement of the slide 2 in response to the manual rotation of shaft 22 (Figs. 1, 3 and 4).

For this purpose, a plate 95 is mounted at the top of the carriage 2. This plate 95, as hereinafter explained, is intended to be rotated through an angle of 60° every time the head 4 is adjusted through that angle. The plate 95 carries six adjustable abutments 96 equiangularly spaced as indicated in Fig. 3. These abutments are in the form of headless screws threaded into the bosses 97 and the plate 95 and held in adjusted position by knurled check nuts 98.

The adjustment of the abutment 96 is such as to permit any desired length of travel to the stationary abutment 99 (Fig. 1). Thus, as the plate 95 is advanced through 60°, one abutment 96 comes into active cooperative relationship with the stationary abutment 99. In this way, downward travel of the carriage 2 is predetermined in accordance with the desires of the operator.

The plate 95 has attached to its lower side a ring 100 as by the aid of screws 101. The inner edge of this ring 100 overlies the recess 102 in the lower side of the plate 95. This recess accommodates a stationary flange 103. This flange is made a part of an externally threaded sleeve 104 threaded into the upper end of the carriage 2. The flange has a running clearance in the space defined between plate 95 and ring 100.

The central aperture 105 of the sleeve 104 serves as a bearing for the cylindrical periphery of a nut 106. This nut 106 is threaded on the upper end of a shaft 107. A lock nut 108 holds the nut 106 firmly in place on the shaft 107.

In order to hold the plate 95 firmly against the nut 106 so that shaft 107 can drive the plate 95, the plate 95 is provided with a central boss 109 contacting the upper surface of the nut 106. The upper surface of the plate 95 is provided with a similar boss 110 engaged by a bowed spring washer 111. Through this washer 111 extends the upper reduced threaded portion 112 of shaft 107. A crown nut 113 urges the spring washer 111 firmly against the surface of boss 110. The amount of frictional force between the boss 109 and the nut 106 is determined by the position of the nut 113.

The upper surface of the nut 106 is thus in driving frictional contact with the plate 95.

The shaft 107, as shown most clearly in Fig. 1, is guided at its lower end by a sleeve 114 mounted in a boss 115 of carriage 2. This sleeve 114 serves as a bearing for the cylindrical periphery of a bevel gear 116. The teeth of this bevel gear mesh with teeth 117 formed on an enlarged part of the shaft 50. This shaft 50, as hereinbefore explained, rotates with the head 4. Accordingly, it rotates intermittently through one-sixth of a revolution as the head 4 is adjusted. Since the gear formed by teeth 117 is provided with the same number of teeth as gear 116, the shaft 107 is also caused to advance by one-sixth of a revolution for each adjustment of the head 4.

By providing the nut 106, the axial position of the shaft 107 may be adjusted so as to provide proper meshing of the bevel gear teeth between the shaft 50 and the bevel gear 116.

The friction drive between the shaft 107 and the plate 95 is especially useful. Thus, if any of the abutments 96 contact an obstruction, the rotation of plate 95 is stopped without stopping rotation of shaft 107. Such obstructions may be apt to occur whenever the manual return of the slide or carriage 2 is inadvertently delayed.

The inventor claims:

1. In a machine tool having a head angularly adjustable about an axis by equal increments for bringing any of a number of rotary tools into operative relation, a power drive for driving the selected tool, and coupled to the selected tool only when the tool is in operative position, means for adjusting the head angularly, a carriage upon which the head is mounted and movable toward and from the work, and a retractable locating pin for the head to permit angular adjustment thereof, the combination therewith of a power transmission for withdrawing the locating pin, for disconnecting the coupling, for operating the adjusting means, and for returning the locating pin and the coupling to engaging positions upon completion of the adjusting movement, all in response to movement of the carriage in a direction away from the work, and including a lever having two projections respectively for operating the pin and the coupling; a one-revolution clutch, a cam operating the lever and moved by power supplied to the clutch; and a force transmitting member for operating the clutch and moved out of force transmitting position by initiation of movement of the lever by the cam.

2. In combination: a rotating clutch part having a face with one or more recesses; a slidable clutch part cooperating with any one of the recesses in the rotating clutch part and retractable from the rotating clutch part; a shaft member coaxial with the rotating clutch part and having a guide passage for the retractable clutch part; said shaft member being driven when the slidable clutch part engages the recess; a leaf spring carried by the shaft member for urging the retractable clutch part toward engaging position, said leaf spring having an edge cooperating with a surface of the slidable clutch part to maintain the said retractable clutch part in position for cooperation with the recesses in the rotating clutch part.

3. In a machine tool having a head angularly adjustable about an axis by equal increments for bringing any of a number of rotary tools into operative position, a carriage upon which the head is mounted, a guide for the carriage, and means for moving the carriage toward and from the work, the combination therewith of means for determining the extent of travel of the carriage for each adjusted position of the head, comprising a stationary abutment; a plurality of adjustable stops arranged in succession to cooperate with the abutment; a plate for supporting said stops; and a friction clutch drive for the plate operating in response to adjusting movement of the head for successively bringing the stops into active position.

4. In a mechanism having an axis of rotation, a clutch part rotating about said axis and having one or more angularly spaced recesses extending in a substantially radial direction, a cooperating slidable clutch part spaced from said axis and engageable in any of the recesses to provide a coupling between the parts, resilient means for urging the slidable clutch part to engaging position, and a shaft carrying the slidable clutch part, to be driven by the rotatable clutch part, the combination therewith of: a cam member that when it is in the path of the angular motion of the slidable clutch part about said axis engages and moves the clutch part to retract it from the rotating clutch part for disengaging the clutch parts, and when the cam member is out of the angular motion of the slidable clutch part, the said slidable clutch part is urged toward the rotating clutch part; a pin upon which the cam member is pivotally mounted; a force transmitting member pivotally carried on an axis spaced from that of the pin, for causing the cam member to be moved out of said path; resilient means interposed between the force transmitting member and the cam member for optionally rendering said force transmitting member ineffective; means pivotally mounted on the pin and operated by the rotation of the slidable clutch part about the clutch axis, for moving the force transmitting member to inactive position; and resilient means interposed between the cam member and the means for moving the force transmitting member, for urging the cam member toward the said path of angular motion.

5. In a mechanism of the character described: a one-revolution clutch having a pair of clutch parts adapted to cooperate to transmit motion; one of the clutch parts being movable into and out of driving engagement with the other clutch part; means urging said one clutch part toward engaging position with respect to the other clutch part; and a mechanism for moving the one clutch part into and out of engaging position with respect to the other clutch part, comprising: a movable cam member having a cam surface cooperating with the one clutch part to engage and move said one clutch part out of engagement, when the cam member is in one position, and in an alternate position, to free the said one clutch part so that said one clutch part may engage the said other clutch part; a force transmitting member pivotally carried by the cam member for urging the cam member to said alternate position; an abutment for engaging the force transmitting member and thereby to cause the cam member to move to free the said one clutch part; and means operated by rotation of said one clutch part due to engagement of the clutch parts, for moving the force transmitting member out of operative position.

6. The combination as set forth in claim 5, in which the means operated by rotation of said one clutch part is a lever pivotally mounted on the cam member; and the combination further including resilient means interposed between the lever and the cam member for urging the cam member toward its said one position.

7. In a mechanism having an axis of rotation, a clutch part rotating about said axis and having one or more angularly spaced recesses extending in a substantially radial direction, a cooperating slidable clutch part spaced from said axis and engageable in any of the recesses to provide a coupling between the parts, resilient means for urging the slidable clutch part to engaging position, and a shaft carrying the slidable clutch part, to be driven by the rotatable clutch part, the combination therewith of: a pivotally mounted cam member capable of being placed in the angular path of movement of the slidable clutch part and having one position in which it can move the slidable clutch part out of engagement, as well as to maintain said clutch part in disengaged position; said cam member having another position in which said cam member frees the said slidable clutch part for engagement with the rotating clutch part; force transmitting means for momentarily urging said cam member into said other position; a lever pivotally mounted upon the axis of movement of the cam member; and means forming a cam surface angularly movable with the slidable clutch part about the axis of rotation of the clutch, for urging the lever to a position rendering said force transmitting means ineffective as soon as the slidable clutch part is moved angularly by the rotating clutch part.

References Cited in the file of this patent
UNITED STATES PATENTS

| | | |
|---|---|---|
| 2,306,730 | Holmes | Dec. 29, 1942 |
| 2,365,093 | Meyer | Dec. 12, 1944 |
| 2,670,636 | Burg | Mar. 2, 1954 |
| 2,779,175 | Le Hew | Jan. 29, 1957 |
| 2,795,307 | Burg | June 11, 1957 |